United States Patent
Xiao (10) Patent No.: US 11,636,665 B2
(45) Date of Patent: Apr. 25, 2023

(54) STREAMING IMAGE SEMANTIC SEGMENTATION METHOD, LOGICAL INTEGRATED CIRCUIT SYSTEM AND ELECTRONIC DEVICE

(71) Applicant: Shenzhen Corerain Technologies Co., Ltd., Shenzhen (CN)

(72) Inventor: Mengqiu Xiao, Shenzhen (CN)

(73) Assignee: SHENZHEN CORERAIN TECHNOLOGIES CO., LTD., Guangdong (CN)

( * ) Notice: Subject to any disclaimer, the term of this patent is extended or adjusted under 35 U.S.C. 154(b) by 115 days.

(21) Appl. No.: 16/962,444

(22) PCT Filed: Jan. 15, 2018

(86) PCT No.: PCT/CN2018/072674
§ 371 (c)(1),
(2) Date: Jul. 15, 2020

(87) PCT Pub. No.: WO2019/136760
PCT Pub. Date: Jul. 18, 2019

(65) Prior Publication Data
US 2021/0082119 A1 Mar. 18, 2021

(51) Int. Cl.
*G06N 3/045* (2023.01)
*G06V 10/44* (2022.01)
(Continued)

(52) U.S. Cl.
CPC ........ *G06V 10/454* (2022.01); *G06F 18/2431* (2023.01); *G06N 3/045* (2023.01);
(Continued)

(58) Field of Classification Search
CPC ........ G06N 3/0454; G06N 3/08; G06N 20/00; G06N 3/045; G06N 3/02; G06N 3/0455;
(Continued)

(56) References Cited

U.S. PATENT DOCUMENTS 7,298,877 B1  11/2007 Collins et al.
10,402,689 B1 * 9/2019 Bogdanovych ...... G06K 9/6256
(Continued)

FOREIGN PATENT DOCUMENTS

CN  101681449 B  *  3/2013  ............... G06N 3/08
CN  104504734     4/2015
(Continued)

OTHER PUBLICATIONS

Fourure et al., Residual Conv-Deconv Grid Network for Semantic Segmentation, Jul. 26, 2017 [retrieved Feb. 17, 2022], Cornell University: arXiv [open access archive], pp. 1-12. Retrieved: https://arxiv.org/abs/1707.07958v2 (Year: 2017).*
(Continued)

*Primary Examiner* — Matthew C Bella
*Assistant Examiner* — Dennis Rosario
(74) *Attorney, Agent, or Firm* — Ladas & Parry, LLP (57) ABSTRACT

Disclosed are an image semantic segmentation method, a logical integrated circuit, a system and an electronic device. The logical integrated circuit includes a convolution processing module and a deconvolution processing module. The convolution processing module performs convolution operation processing on an image to generate a piece of feature data of each and every feature image block of the image. The deconvolution processing module is configured to perform deconvolution operation processing on each piece of feature data to obtain an respective image block region; determine an approximation degree of the each piece of feature data and each and every preset semantic category of multiple preset semantic categories, and classify the each piece of feature data into a preset semantic category; and fill each image block region corresponding to the each piece of feature data with a filling color to achieve semantic segmentation of the image.

14 Claims, 3 Drawing Sheets

(51) Int. Cl.
*G06T 7/11* (2017.01)
*G06T 11/40* (2006.01)
*G06V 30/262* (2022.01)
*G06F 18/2431* (2023.01)
*G06V 30/19* (2022.01)

(52) U.S. Cl.
CPC .............. *G06T 7/11* (2017.01); *G06T 11/40* (2013.01); *G06V 30/19173* (2022.01); *G06V 30/274* (2022.01)

(58) Field of Classification Search
CPC ........ G06N 20/20; G06V 10/82; G06V 20/58; G06V 10/44; G06V 20/588; G06V 10/25; G06V 20/35; G06V 10/26; G06V 20/00; G06V 10/255; G06V 10/50; G06V 10/955; G06V 20/695; G06V 10/70; G06V 10/764; G06V 30/19173; G06T 2207/20084; G06T 7/11; G06T 7/10; G06T 7/194; G06T 7/12; G06T 7/187; G06K 9/628; G06K 9/00536
See application file for complete search history.

(56) References Cited

U.S. PATENT DOCUMENTS

| | | | | |
|---|---|---|---|---|
| 2018/0032857 | A1* | 2/2018 | Lele | G06N 3/0454 |
| 2018/0336683 | A1* | 11/2018 | Feng | G06T 7/13 |
| 2019/0130573 | A1* | 5/2019 | Xu | G06T 7/11 |

FOREIGN PATENT DOCUMENTS

| | | | | |
|---|---|---|---|---|
| CN | 106709568 | | 5/2017 | |
| CN | 106709924 | | 5/2017 | |
| CN | 107016415 | | 8/2017 | |
| JP | 2000501918 | A * | 2/2000 | |
| WO | WO-2019127507 | A1 * | 7/2019 | G06F 13/1668 |

OTHER PUBLICATIONS

Szegedy et al., Going deeper with convolutions, Sep. 17, 2014 [retrieved Feb. 17, 2022], Cornell University: arXiv [open access archive], pp. 1-12. Retrieved: https://arxiv.org/abs/1409.4842 (Year: 2014).*
Machine translation via Search of WO 2019/127507 A1, 28 pages. (Year: 2022).*
Machine translation via Search of JP-2000-501918-A, 8 pages. (Year: 2022).*
Liu et al., Optimizing CNN-based Segmentation with Deeply Customized Convolutional and Deconvolutional Architectures on FPGA, Sep. 2018 [retrieved Jul. 1, 2022], ACM Transactions on Reconfigurable Technology and Systems, vol. 11, Issue 3, Article No. 19, pp. 1-22. Retrieved: (Year: 2018).*
[item W continued] https://dl.acm.org/doi/abs/10.1145/3242900 (Year: 2018).*
Clukey, Architecture for Real-Time, Low-SWaP Embedded Vision Using FPGAs, Thesis, Dec. 2016 [retrieved Jun. 29, 2022], University of Tennessee, Knoxville, 144 pages. Retrieved: https://trace.tennessee.edu/utk_gradthes/4281/ (Year: 2016).*
Zhang et al., Optimizing FPGA-based Accelerator Design for Deep Convolutional Neural Networks, Feb. 22, 2015 [retrieved Jul. 1, 2022], FPGA '15: Proceedings of the 2015 ACM/SIGDA International Symposium on Field-Programmable Gate Arrays, pp. 161-170. Retrieved: (Year: 2015).*
[item V continued] https://dl.acm.org/doi/abs/10.1145/2684746.2689060 (Year: 2015).*
Search machine translation of CN 101681449 B to Kato et al., retrieved Feb. 17, 2023, 22 pages. (Year: 2023).*
Zlateski et al., Compile-Time Optimized and Statically Scheduled N-D ConvNet Primitives for Multi-Core and Many-Core (Xeon Phi) CPUs, Jun. 14, 2017 [retrieved Feb. 17, 2023], ICS '17: Proceedings of the International Conference on Supercomputing (Year: 2017).*
[item V continued], Article No. 8, 10 pages. Retrieved: https://dl.acm.org/doi/abs/10.1145/3079079.3079081 (Year: 2017).*
International Search Report in PCT/CN2018/072674 dated Aug. 31, 2018.

* cited by examiner

STREAMING IMAGE SEMANTIC SEGMENTATION METHOD, LOGICAL INTEGRATED CIRCUIT SYSTEM AND ELECTRONIC DEVICE

CROSS-REFERENCE TO RELATED APPLICATIONS

This is a National Stage Application, filed under 35 U.S.C. 371, of International Patent Application No. PCT/CN2018/072674 filed on Jan. 15, 2018, the content of which is incorporated herein by reference in its entirety.

TECHNICAL FIELD

The present disclosure relates to the field of image processing, and particularly to an image semantic segmentation method, a logical integrated circuit, a system and an electronic device.

BACKGROUND

With the development of deep learning technology, computers have increasing capability of semantic segmentation on images. The image semantic segmentation technology based on deep learning may be used for rapidly performing semantic segmentation on an image, pixels with the same semantics at different positions in the image are clustered into one category and marked with a same color. However, the existing image semantic segmentation is achieved through software programming, and its processing speed needs to be increased.

SUMMARY

In view of the above-mentioned defects of the existing art, the present disclosure aims to provide an image semantic segmentation method, a logical integrated circuit, a system and an electronic device, so that image semantic segmentation is achieved through the logical integrated circuit, so as to increase the processing speed of the image semantic segmentation.

In order to achieve the above objectives and other related objectives, the present disclosure provides an image semantic segmentation method. The method is applied to a logical integrated circuit, the logical integrated circuit includes a convolution processing module and a deconvolution processing module, the method includes steps described below. The convolution processing module is used to receive an image to be semantically segmented and perform convolution operation processing on the image to generate a piece of feature data of each and every feature image block of the image. The deconvolution processing module is used to perform deconvolution operation processing on each piece of feature data to obtain a respective image block region with the same size as the feature image block corresponding to the each piece of feature data; determine an approximation degree of the each piece of feature data and each and every preset semantic category of multiple preset semantic categories, and classify the each piece of feature data into a preset semantic category with a highest approximation degree with the each piece of feature data, where the multiple preset semantic categories are in one-to-one correspondence with multiple filling colors; and fill each image block region corresponding to the each piece of feature data with a filling color associated with the preset semantic category into which the each piece of feature data is classified to achieve semantic segmentation of the image.

In an embodiment of the present disclosure, the logical integrated circuit further includes a streaming lake module, which is electrically connected to the convolution processing module and the deconvolution processing module; the method further includes: the convolution processing module and the deconvolution processing module are used to transmit or receive data through the streaming lake module in a time-division multiplexing manner.

In an embodiment of the present disclosure, the method further includes: the convolution processing module is used to perform the convolution operation processing again on the basis of the convolution operation processing on the image for a previous time, to increase a number of convolution layers and reduce a number of pieces of feature data.

In an embodiment of the present disclosure, the method further includes: the deconvolution processing module is used to perform the deconvolution operation processing again on the basis of the deconvolution operation processing on the image for the previous time until all image layers subjected to the convolution operation processing are restored in size one by one.

In order to achieve the above objectives and other related objectives, the present disclosure provides a logical integrated circuit. The logical integrated circuit includes a convolution processing module and a deconvolution processing module. The convolution processing module is configured to receive an image to be semantically segmented, and perform convolution operation processing on the image to generate a piece of feature data of each and every feature image block of the image. The deconvolution processing module is configured to: perform deconvolution operation processing on each piece of feature data to obtain a respective image block region with the same size as the feature image block corresponding to the each piece of feature data; determine an approximation degree of the each piece of feature data and each and every preset semantic category of multiple preset semantic categories, and classify the each piece of feature data into a preset semantic category with a highest approximation degree with the each piece of feature data, where the multiple preset semantic categories are in one-to-one correspondence with multiple filling colors; and fill each image block region corresponding to the each piece of feature data with a filling color associated with the preset semantic category into which the each piece of feature data is classified to achieve semantic segmentation of the image.

In an embodiment of the present disclosure, the logical integrated circuit further includes a streaming lake module, which is electrically connected to the convolution processing module and the deconvolution processing module, and is used by the convolution processing module and the deconvolution processing module to transmit or receive data in a time-division multiplexing manner.

In an embodiment of the present disclosure, the convolution processing module is further configured to perform the convolution operation processing again on the basis of the convolution operation processing on the image for a previous time, to increase a number of convolution layers and reduce a number of pieces of feature data.

In an embodiment of the present disclosure, the deconvolution processing module is further configured to perform the deconvolution operation processing again on the basis of the deconvolution operation processing on the image for the previous time until all image layers subjected to the convolution operation processing are restored in size one by one.

In order to achieve the above objectives and other related objectives, the present disclosure provides an image semantic segmentation system. The image semantic segmentation system includes the logical integrated circuit of any one of the above embodiments, a central processor, and a memory electrically connected to the central processor. The convolution processing module is electrically connected to the central processor and the memory, and the deconvolution processing module is electrically connected to the central processor and the memory. In a case where the logical integrated circuit further includes the streaming lake module, the streaming lake module is also electrically connected to the memory.

In order to achieve the above objectives and other related objectives, the present disclosure provides an electronic device. The electronic device includes the image semantic segmentation system of any one of the above embodiments.

As described above, the image semantic segmentation method, the logical integrated circuit, the system, and the electronic device of the present disclosure implement the image semantic segmentation processing through a hardware circuit, which greatly increases the processing speed of the image semantic segmentation.

DETAILED DESCRIPTION

Implementations of the present disclosure are described below by way of specific examples, and those skilled in the art will readily appreciate other advantages and effects of the present disclosure from contents disclosed in this description. The present disclosure may also be implemented or applied through additional different specific implementations, and various modifications or changes may also be made in the details of the description based on different viewpoints and applications without departing from the spirit of the present disclosure. It should be noted that the following embodiments and the features in the embodiments may be combined with each other without conflict.

It should be noted that the drawings provided in the following embodiments merely illustrate the basic idea of the present disclosure. Only the components related to the present disclosure are shown in the drawings, and the components are not drawn according to the number, shape, and size in an actual implementation. The type, quantity and scale of the components in the actual implementation may be changed freely, and the layout pattern of the components may also be more complex.

The present disclosure provides a logical integrated circuit (FPGA circuit) capable of realizing an image semantic segmentation task, an image semantic segmentation system including the logical integrated circuit and an electronic device including the image semantic segmentation system. In addition, the present disclosure further provides an image semantic segmentation method applied to the logical integrated circuit. Compared with the existing way of implementing image semantic segmentation through software, the present disclosure greatly increases the processing speed of the image semantic segmentation by adopting a hardware circuit.

Figure 1:
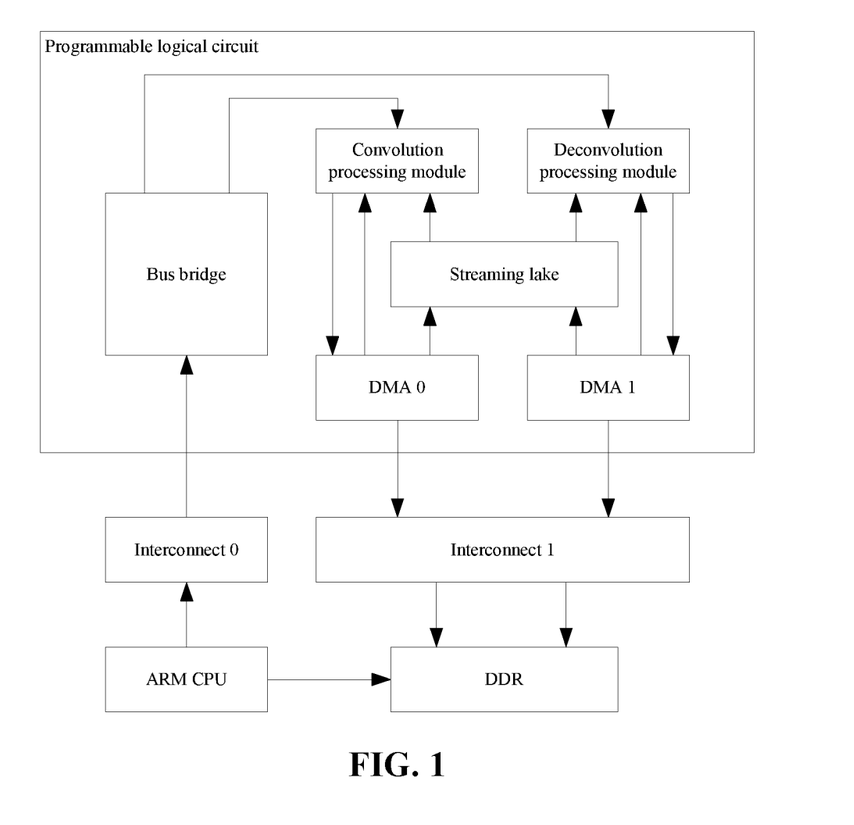
FIG. 1 shows a schematic diagram of the architecture of an image semantic segmentation system in an embodiment of the present disclosure.

FIG. 1 shows a schematic diagram of the architecture of an image semantic segmentation system. The image semantic segmentation system includes: a logical integrated circuit, a central processor (ARM CPU) and a memory (DDR) which are connected to the outside the logical integrated circuit. Specifically, the logical integrated circuit mainly includes a convolution processing module and a deconvolution processing module. Both the convolution processing module and the deconvolution processing module are electrically connected between the central processor and the memory. Of course, the central processor is electrically connected to the memory and thus calls the memory.

In an embodiment shown in FIG. 1, the convolution processing module and the deconvolution processing module are finally connected to the central processor through a bus bridge (AXI4-Lite Bridge) and an interconnection (interconnect 0); and the convolution processing module and the deconvolution processing module are firstly electrically connected to respective direct memory access modules (DMA0 and DMA1), and then are finally connected to the memory through an interconnection (interconnect 1). In another embodiment, a streaming lake module is also electrically connected between the convolution processing module and the deconvolution processing module, so that the convolution processing module and the deconvolution processing module may transmit or receive data in a time-division multiplexing manner. In an embodiment, the streaming lake module may be embodied on a shared cache, and the streaming lake is a system or repository of streaming data.

It should be noted that, in the image semantic segmentation system of the present disclosure, the electrical connection from the convolution processing module and the deconvolution processing module to the central processor and the memory is not limited to this embodiment, and those skilled in the art can make choices or transformations according to actual application scenes.

A circuit structure of the convolution processing module includes, for example, a parameter cache, an input cache, a convolution operation circuit and an output cache. The parameter cache and the output cache are respectively connected to the convolution operation circuit. The convolution processing module is electrically connected to an external memory, and the external memory stores data to be processed and a weighting parameter.

The parameter cache is configured to receive and output the weighting parameter. The input cache includes multiple row caches which are connected to each other and configured to receive and output the data to be processed; each time each of the multiple row caches outputs one data bit, the data bits outputted by the row caches are collected to form a column of data output. The convolution operation circuit is configured to receive the data to be processed from the input cache and receive the weighting parameter from the parameter cache, perform a convolution operation on the data to be processed according to the weighting parameter, and output a convolution operation result. The output cache is configured to receive the convolution operation result and output the convolution operation result to the external memory.

The convolution operation circuit includes multiple convolution kernels running in parallel and an adder tree. Each of the multiple convolution kernels includes a multiplier for performing the convolution operation. The adder tree is configured to accumulate results outputted by the multipliers; each convolver has pixel data inputted in a form of a K×K matrix, performs the convolution operation on the inputted pixel data according to the weighting parameter, and outputs the pixel data bit-by-bit. The convolver further includes a pooling operation circuit. The pooling operation circuit is connected between the output cache and the external memory, and configured to pool the convolution operation result and then output the convolution operation result to the external memory.

According to this embodiment, after receiving the image to be semantically segmented, the convolution processing module performs convolution operation processing on the image, thereby obtaining feature data of each and every feature image block of the image. Specifically, the convolution processing module traverses the image with a preset convolution kernel (such as a 3×3 filter matrix); in this way, for each pixel of the image, products of neighborhood pixels of this pixel and corresponding elements in the filter matrix may be calculated and then summed as a value corresponding to a position of this pixel. In order to facilitate explanation, a set including a pixel and its neighborhood pixels is referred to as a feature image block, and the calculated value corresponding to the position of the pixel is referred to as feature data in the present disclosure.

According to this embodiment, the deconvolution processing module performs deconvolution operation processing on each piece of feature data, to obtain a respective image block region with the same size as the feature image block corresponding to the feature data. To undertake the above, the image block region subjected to "all-in-one" in the convolution process are restored. The restored image block region needs to be filled with colors according to a semantic category of the restored image block region, so that the semantics of this image block region may be identified straightforward.

A circuit structure of the deconvolution processing module includes, for example, a parameter cache, an input cache, a deconvolution operation circuit and an output cache. The parameter cache and the output cache are respectively connected to the deconvolution operation circuit. The deconvolution processing module is electrically connected to an external memory, and the external memory stores data to be processed and a weighting parameter.

The parameter cache is configured to receive and output the weighting parameter. The input cache includes multiple row caches which are connected to each other and configured to receive and output the data to be processed; each time each of the multiple row caches outputs one data bit, and the data bits outputted by the row caches are collected to form a column of data output. The deconvolution operation circuit is configured to receive the data to be processed from the input cache and receive the weighting parameter from the parameter cache, perform a deconvolution operation on the data to be processed according to the weighting parameter, and output a deconvolution operation result. The output cache is configured to receive the deconvolution operation result and output the deconvolution operation result to the external memory.

The deconvolution operation circuit includes multiple deconvolution kernels running in parallel and an adder tree. Each of the multiple deconvolution kernels includes a multiplier for performing the deconvolution operation. The adder tree is configured to accumulate results outputted by the multipliers; each deconvolver has pixel data inputted in a form of a K×K matrix, performs the deconvolution operation on the inputted pixel data according to the weighting parameter, and outputs the pixel data bit-by-bit. The deconvolver further includes a pooling operation circuit. The pooling operation circuit is connected between the output cache and the external memory, and configured to pool the convolution operation result and then output the convolution operation result to the external memory.

Below is detailed description of how the deconvolution processing module of the present embodiment determines which semantic category the restored image block region belongs to and which color the restored image block region is filled.

Firstly, an approximation degree of the each piece of feature data and each and every preset semantic category of multiple preset semantic categories is determined, and the each piece of feature data is classified into a preset semantic category with a highest approximation degree with the each piece of feature data. For example, pre-defined semantic categories include a house category, a road category and a vegetation category; each category has a value range, the each piece of feature data is compared with these value ranges, and the closer the each piece of feature data is to a value range, the each piece of feature data is classified into a category having the value range closest to the each piece of feature data. Secondly, the preset semantic categories are in one-to-one correspondence with filling colors; for example, blue corresponds to the house category, gray corresponds to the road category, and green corresponds to the vegetation category. After the semantic category of the each piece of feature data is determined, the color to be filled in the image block region restored by the each piece of feature data is also determined; for example, the image block region restored by the each piece of feature data classified as the house category is filled with blue, the image block region restored by the each piece of feature data classified as the road category is filled with gray, and the image block region restored by the each piece of feature data classified as the vegetation category is filled with green.

Figure 2A:
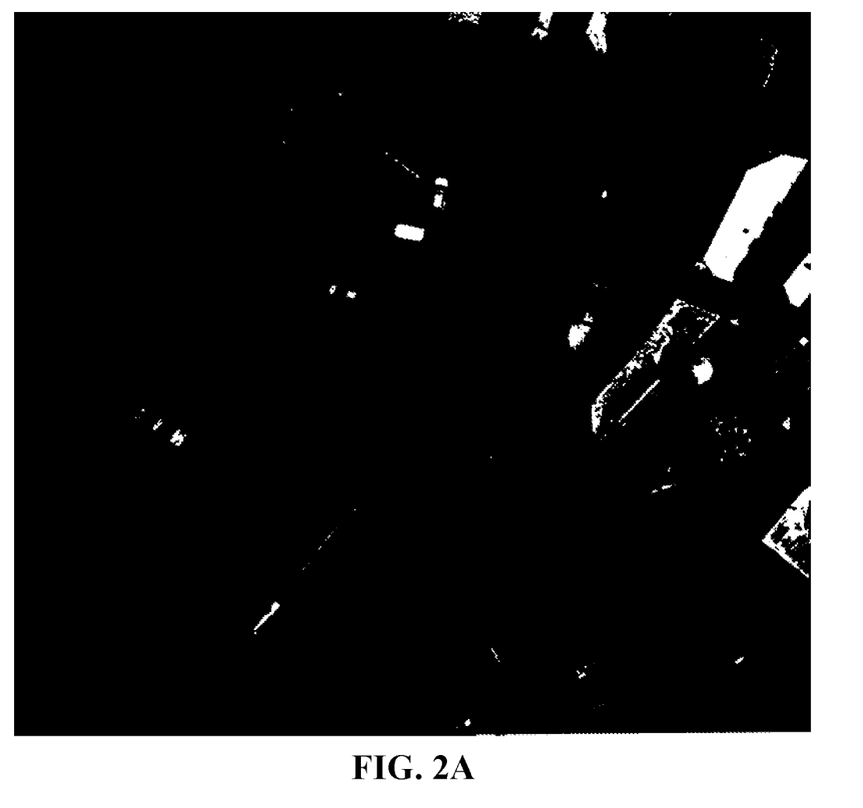
FIGS. 2A and 2B show a simulation original picture and an effect picture of the simulation original picture after being processed by the image semantic segmentation system of the present disclosure, respectively.
Figure 2B:
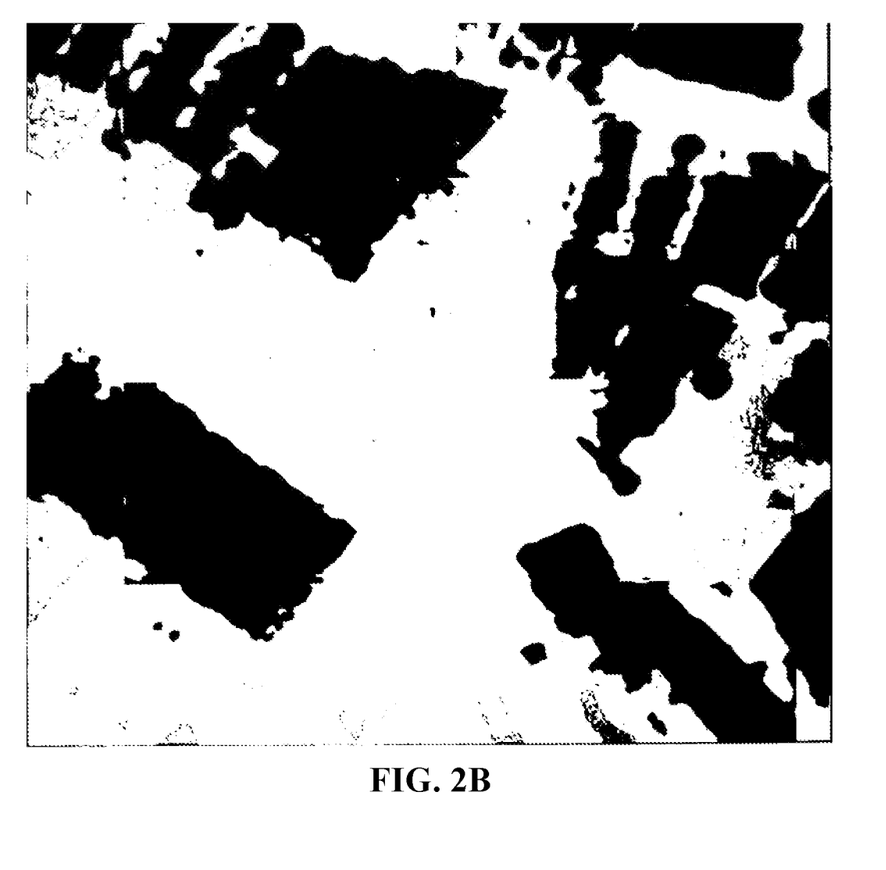

FIG. 2A shows a top-view photo of a certain street scene, the photo includes various objects such as houses, roads and vegetation. FIG. 2B is an effect picture of the semantic segmentation achieved through the image semantic segmentation system proposed by the present disclosure, in which different objects in a street picture are distinguished through different colors.

It can be seen from the above embodiments that a large amount of feature data will be generated after an image traversed by a convolution kernel, which increases the workload of semantic category determination. In another embodiment, the convolution processing module performs convolution processing on the image for multiple times, that is, the convolution processing module performs the convolution operation processing again on the basis of the convolution operation processing on the image for a previous time, and repeats again and again, so as to increase a number of convolution layers and reduce a number of pieces of feature data. Correspondingly, when the image block region is restored, the deconvolution processing module also needs to perform the deconvolution operation processing again on the basis of the deconvolution operation processing on the image for the previous time until all image layers subjected to the convolution operation processing are restored in size one by one.

It should be noted that any electronic device including the image semantic segmentation system in any one of the foregoing embodiments should also be within the protection scope of the present disclosure, and is not specifically disclosed herein for sake of brevity.

Corresponding to the above system embodiment, the present disclosure further provides an image semantic segmentation method, which is executed by the logical integrated circuit in any one of the foregoing embodiments. The technical features in the foregoing embodiments may also be applied to the method embodiment, and will not be detailed herein again. The image semantic segmentation method of this embodiment mainly includes steps described below.

Firstly, the convolution processing module receives an image to be semantically segmented, and performs convolution operation processing on the image to generate a piece of feature data of each and every feature image block of the image.

Secondly, the deconvolution processing module performs deconvolution operation processing on each piece of feature data to obtain a respective image block region with the same size as the feature image block corresponding to the each piece of feature data; determines an approximation degree of the each piece of feature data and each and every preset semantic category of multiple preset semantic categories, and classifies the each piece of feature data into a preset semantic category with a highest approximation degree with the each piece of feature data; where the multiple preset semantic categories are in one-to-one correspondence with multiple filling colors.

Thirdly, each image block region corresponding to the each piece of feature data is filled with a filling color associated with the preset semantic category into which the each piece of feature data is classified to achieve semantic segmentation of the image.

For the logical integrated circuit including a streaming lake module, the convolution processing module and the deconvolution processing module transmit or receive data through the streaming lake module in a time-division multiplexing manner.

In another embodiment, the convolution processing module performs convolution processing on the image for multiple times, that is, the convolution processing module performs the convolution operation processing again on the basis of the convolution operation processing on the image for a previous time, and circulation is performed in sequence, so as to increase a number of convolution layers and reduce a number of pieces of feature data. Correspondingly, when the image block region is restored, the deconvolution processing module also needs to perform the deconvolution operation processing again on the basis of the deconvolution operation processing on the image for the previous time until all image layers subjected to the convolution operation processing are restored in size one by one.

It should be noted that the scope of protection of the present disclosure is not limited to the execution sequence of the steps of the image semantic segmentation method listed in this embodiment, and all variations such as flexible sequence adjustment, replacement, deletion and addition of the steps according to actual requirements are included in the scope of protection of the present disclosure.

In summary, the image semantic segmentation method, the logical integrated circuit, the system and the electronic device of the present disclosure implement the image semantic segmentation processing through the hardware circuit, increase the image processing speed, significantly overcome various disadvantages in the existing art, and thus have high industrial utilization value.

The above-mentioned embodiments are merely illustrative of the principles and utilities of the present disclosure, and are not intended to limit the present disclosure. Those skilled in the art may modify or change the above embodiments without departing from the spirit and scope of the present disclosure. Therefore, it is intended that all equivalent modifications or changes made by those of ordinary skill in the art should still be covered by the claims of the present disclosure without departing from the spirit and technical idea disclosed by the present disclosure.

What is claimed is:

1. An image semantic segmentation method, wherein the method is applied to a logical integrated circuit, the logical integrated circuit comprises a convolution processing module and a deconvolution processing module electrically connected to the convolution processing module, a first direct memory access module (DMA) and a second DMA; wherein the convolution processing module and the deconvolution processing module are firstly electrically connected to the first DMA and the second DMA respectively, and then are finally connected to a memory through an interconnection; wherein the method comprises:
   using the convolution processing module to receive an image to be semantically segmented and perform convolution operation processing on each and every feature image block of the image to generate a piece of feature data of the each and every feature image block of the image; and
   using the deconvolution processing module to
   perform deconvolution operation processing on each piece of feature data to obtain a respective image block region with the same size as the each and every feature image block corresponding to the each piece of feature data;
   determine an approximation degree of the each piece of feature data and each and every preset semantic category of a plurality of preset semantic categories, and
   classify the each piece of feature data into a preset semantic category with a highest approximation degree with the each piece of feature data, wherein the plurality of preset semantic categories are in one-to-one correspondence with a plurality of filling colors; and
   fill each image block region corresponding to the each piece of feature data with a filling color associated with the preset semantic category into which the each piece of feature data is classified to achieve semantic segmentation of the image;
   wherein the logical integrated circuit further comprises a streaming lake cache electrically connected to the convolution processing module and the deconvolution processing module, wherein the method further comprises:
   using the convolution processing module and the deconvolution processing module to transmit or receive data through the streaming lake cache in a time-division multiplexing manner.

2. The method of claim 1, further comprising: using the convolution processing module to perform the convolution operation processing again on the basis of the convolution operation processing on the image for a previous time, to increase a number of convolution layers and reduce a number of pieces of feature data.

3. The method of claim 2, further comprising: using the deconvolution processing module to perform the deconvolution operation processing again on the basis of the deconvolution operation processing on the image for the previous time until all image layers subjected to the convolution operation processing are restored in size one by one.

4. The method of claim 1, wherein the streaming lake is a system or repository of streaming data.

5. A logical integrated circuit, comprising a convolution processing module and a deconvolution processing module electrically connected to the convolution processing module, a first direct memory access module (DMA) and a second DMA; wherein the convolution processing module and the deconvolution processing module are firstly electrically connected to the first DMA and the second DMA respectively, and then are finally connected to a memory through an interconnection;

wherein the convolution processing module is configured to receive an image to be semantically segmented, and perform convolution operation processing on each and every feature image block of the image to generate a piece of feature data of the each and every feature image block of the image;

the deconvolution processing module is configured to perform deconvolution operation processing on each piece of feature data to obtain a respective image block region with the same size as the each and every feature image block corresponding to the each piece of feature data;

determine an approximation degree of the each piece of feature data and each and every preset semantic category of a plurality of preset semantic categories, and classify the each piece of feature data into a preset semantic category with a highest approximation degree with the each piece of feature data, wherein the plurality of preset semantic categories are in one-to-one correspondence with a plurality of filling colors; and fill each image block region corresponding to the each piece of feature data with a filling color associated with the preset semantic category into which the each piece of feature data is classified to achieve semantic segmentation of the image, wherein each of the convolution processing module and the deconvolution module is implemented by a circuit;

the logical integrated circuit further comprises a streaming lake cache, wherein the streaming lake cache is electrically connected to the convolution processing module and the deconvolution processing module, and is used by the convolution processing module and the deconvolution processing module to transmit or receive data in a time-division multiplexing manner, wherein the streaming lake cache is implemented by a circuit.

6. The logical integrated circuit of claim 5, wherein the convolution processing module is further configured to perform the convolution operation processing again on the basis of the convolution operation processing on the image for a previous time, to increase a number of convolution layers and reduce a number of pieces of feature data.

7. The logical integrated circuit of claim 6, wherein the deconvolution processing module is further configured to perform the deconvolution operation processing again on the basis of the deconvolution operation processing on the image for the previous time until all image layers subjected to the convolution operation processing are restored in size one by one.

8. The logical integrated circuit of claim 5, wherein the streaming lake is a system or repository of streaming data.

9. An image semantic segmentation system, comprising a central processor, a memory electrically connected to the central processor, and a logical integrated circuit, wherein the logical integrated circuit comprises: a convolution processing module and a deconvolution processing module electrically connected to the convolution processing module, a first direct memory access module (DMA) and a second DMA; wherein the convolution processing module and the deconvolution processing module are firstly electrically connected to the first DMA and the second DMA respectively, and then are finally connected to the memory through an interconnection;

wherein the convolution processing module is configured to receive an image to be semantically segmented, and perform convolution operation processing on each and every feature image block of the image to generate a piece of feature data of the each and every feature image block of the image;

the deconvolution processing module is configured to perform deconvolution operation processing on each piece of feature data to obtain a respective image block region with the same size as the each and every feature image block corresponding to the each piece of feature data;

determine an approximation degree of the each piece of feature data and each and every preset semantic category of a plurality of preset semantic categories, and classify the each piece of feature data into a preset semantic category with a highest approximation degree with the each piece of feature data, wherein the plurality of preset semantic categories are in one-to-one correspondence with a plurality of filling colors; and fill each image block region corresponding to the each piece of feature data with a filling color associated with the preset semantic category into which the each piece of feature data is classified to achieve semantic segmentation of the image, wherein each of the convolution processing module and the deconvolution module is implemented by a circuit wherein the convolution processing module is electrically connected to the central processor and the memory, the deconvolution processing module is electrically connected to the central processor and the memory, and in a case where the logical integrated circuit further comprises a streaming lake cache, the streaming lake cache is also electrically connected to the memory, and is used by the convolution processing module and the deconvolution processing module to transmit or receive data in a time-division multiplexing manner, wherein the streaming lake cache is implemented by a circuit.

10. The image semantic segmentation system of claim 9, wherein the image semantic segmentation system is tantamount to or constitutes the whole of an electronic device.

11. The image semantic segmentation system of claim 9, wherein the logical integrated circuit further comprises a streaming lake cache, wherein the streaming lake cache is electrically connected to the convolution processing module and the deconvolution processing module, and is used by the convolution processing module and the deconvolution processing module to transmit or receive data in a time-division multiplexing manner, wherein the streaming lake cache is implemented by a circuit.

12. The image semantic segmentation system of claim 9, wherein the convolution processing module is further configured to perform the convolution operation processing again on the basis of the convolution operation processing on the image for a previous time, to increase a number of convolution layers and reduce a number of pieces of feature data.

13. The image semantic segmentation system of claim 12, wherein the deconvolution processing module is further configured to perform the deconvolution operation processing again on the basis of the deconvolution operation processing on the image for the previous time until all image layers subjected to the convolution operation processing are restored in size one by one.

14. The image semantic segmentation system of claim 9, wherein the streaming lake is a system or repository of streaming data.

\* \* \* \* \*